United States Patent
Jones et al.

(10) Patent No.: US 10,315,678 B2
(45) Date of Patent: Jun. 11, 2019

(54) RETAIL FACILITY SHOPPING CART AND INTEGRATED STOOL AND METHOD OF ENHANCING CUSTOMERS' SHOPPING EXPERIENCES

(71) Applicant: Walmart Apollo, LLC, Bentonville, AR (US)

(72) Inventors: Matthew A. Jones, Bentonville, AR (US); Nicholaus A. Jones, Fayetteville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/012,528

(22) Filed: Jun. 19, 2018

(65) Prior Publication Data

US 2018/0370553 A1    Dec. 27, 2018

Related U.S. Application Data

(60) Provisional application No. 62/523,134, filed on Jun. 21, 2017.

(51) Int. Cl.
*B62B 3/14*    (2006.01)
*A47C 12/00*    (2006.01)
*B62B 5/06*    (2006.01)

(52) U.S. Cl.
CPC ............ *B62B 3/1412* (2013.01); *A47C 12/00* (2013.01); *B62B 3/1496* (2013.01); *B62B 5/06* (2013.01)

(58) Field of Classification Search
CPC ... B62B 3/1412; B62B 3/1408; B62B 3/1496; B62B 5/06; A47C 12/00; A47C 13/00

(Continued)

(56) References Cited

U.S. PATENT DOCUMENTS 2,657,936 A * 11/1953 Fabel ..................... B62B 3/04
                                                            280/166
2,827,215 A    3/1958 Burg
(Continued)

FOREIGN PATENT DOCUMENTS

CN    201272375    7/2009
EP    1775193    4/2007

OTHER PUBLICATIONS

PCT; App. No. PCT/US2018/038416; International Search Report and Written Opinion dated Oct. 19, 2018.

*Primary Examiner* — John D Walters
(74) *Attorney, Agent, or Firm* — Fitch, Even, Tabin & Flannery LLP

(57) ABSTRACT

In some embodiments, shopping cart apparatuses are provided herein useful to enable a consumer to reach commercial products positioned above the consumer. In some embodiments, a cart frame having cart wheels coupled to the cart frame is provided. A slide mechanism is slidably cooperated with the cart frame. A weight-bearing platform is secured with the slide mechanism and sliding between stowed and deployed positions such that the weight-bearing platform is moved away from a rear portion of the cart frame when the slide mechanism is in the deployed position. A restricting element is positioned near a front cart wheel and restricts the rotation thereof when the slide mechanism is in the deployed position. A support element is affixed to the weight-bearing platform. An elevating element is secured to the slide mechanism and configured to elevate the cart frame when the threshold amount of pressure is applied upon the weight-bearing platform.

16 Claims, 8 Drawing Sheets

(58) Field of Classification Search
USPC .................................................. 280/33.992
See application file for complete search history.

(56) References Cited

U.S. PATENT DOCUMENTS

| | | | |
|---|---|---|---|
| 3,356,185 A | 12/1967 | Isaacks | |
| 4,096,920 A * | 6/1978 | Heyn | B62B 5/0026 |
| | | | 180/11 |
| 4,610,454 A | 9/1986 | Gill | |
| 4,652,003 A | 3/1987 | Karashima | |
| 4,758,007 A | 7/1988 | Reck | |
| 8,152,177 B1 * | 4/2012 | Johnson | B62B 5/085 |
| | | | 280/33.992 |
| 9,828,014 B1 * | 11/2017 | Gillespie | B62B 3/14 |
| 2005/0017466 A1 | 1/2005 | Dolin | |
| 2006/0145436 A1 | 7/2006 | Varricchio | |
| 2010/0059947 A1 | 3/2010 | Shaw | |

* cited by examiner

RETAIL FACILITY SHOPPING CART AND INTEGRATED STOOL AND METHOD OF ENHANCING CUSTOMERS' SHOPPING EXPERIENCES

CROSS-REFERENCE TO RELATED APPLICATION

This application claims the benefit of U.S. Provisional Application No. 62/523,134, filed Jun. 21, 2017, which is incorporated by reference in its entirety herein.

TECHNICAL FIELD

This invention relates generally to enhancing customer service.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks are also difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF THE DRAWINGS

Disclosed herein are embodiments of shopping cart apparatuses pertaining customer service and methods of enhancing customers' shopping experiences. This description includes drawings, wherein.

Figure 1A:
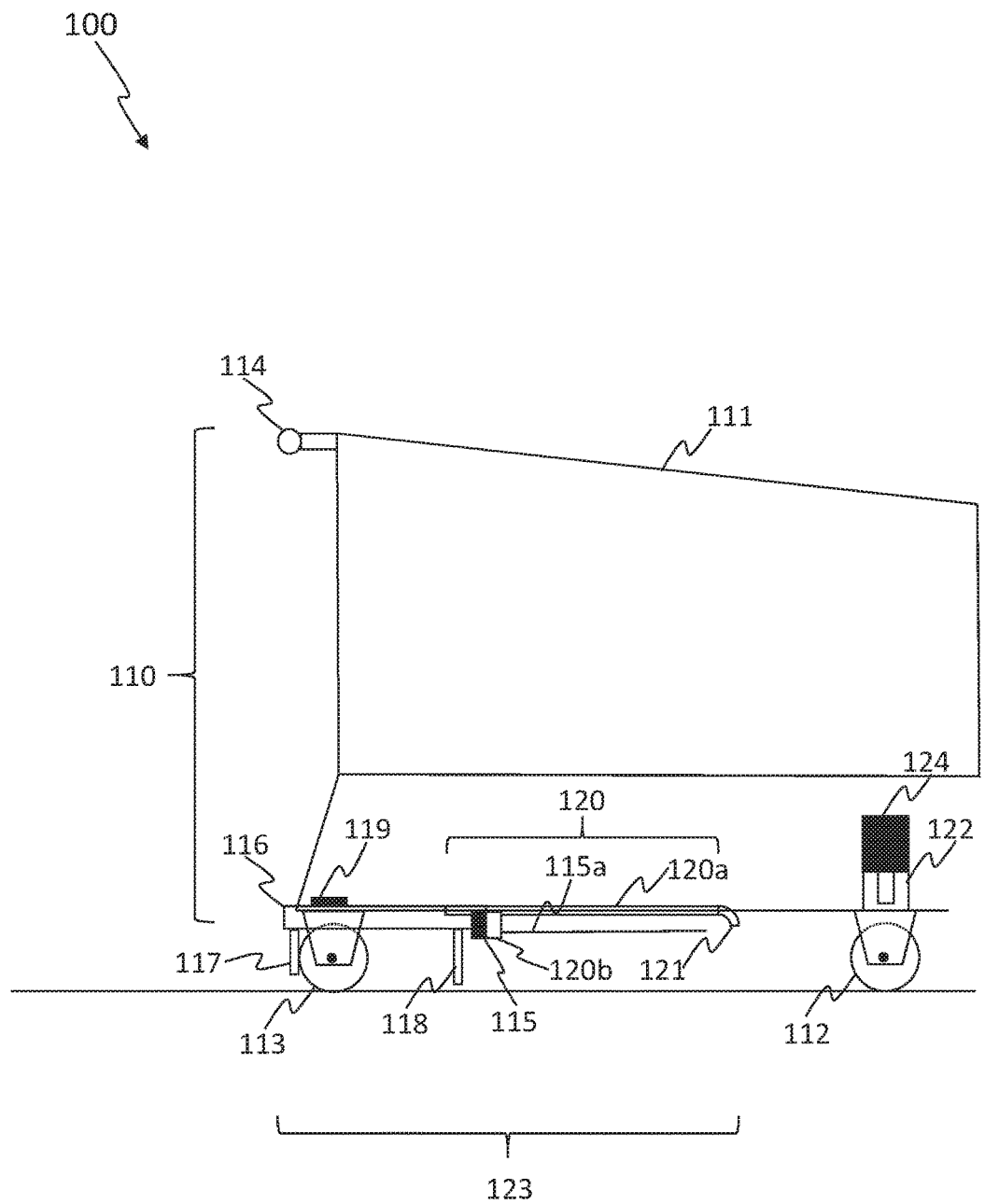
FIG. 1a is an illustration of a cart stool in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

Generally speaking, pursuant to various embodiments, shopping cart apparatuses are provided herein useful to enable a consumer to reach commercial products positioned above the consumer. The shopping cart apparatus may include a cart frame having a plurality of cart wheels coupled to the cart frame. A slide mechanism may be slidably cooperated with the cart frame. A weight-bearing platform can be secured with the slide mechanism proximate a first end of the slide mechanism, wherein the slide mechanism can slide between a stowed position and a deployed position such that the weight-bearing platform can be moved away from a rear portion of the cart frame when the slide mechanism is in the deployed position. One or more restricting elements can each be positioned proximate to one or more front cart wheels included in the plurality of cart wheels and can restrict the rotational movement of the front cart wheel when the slide mechanism is in the deployed position.

One or more support elements can be affixed to the weight-bearing platform. One or more elevating elements can be secured to a second end of the slide mechanism and may be configured to rotably engage a connecting member of the slide mechanism when the slide mechanism is in the deployed position. When the slide mechanism is in the deployed position the support element can be configured to be positioned proximate to the rear-portion of the cart frame in contact with a surface upon which the cart is supported such that the one or more elevating elements can utilize the one or more support elements as contact points with which to lift the rear portion of the cart frame such that the back wheels of the plurality of cart wheels can be lifted off the surface when a threshold amount of pressure is applied upon the weight-bearing platform.

In some embodiments, a shopping cart extension apparatus can be configured to temporarily or permanently affixed to the rear portion of the cart frame via one or more coupling elements to enable consumers to reach commercial products positioned above the consumer. By one approach, the slide mechanism can be configured to be slidably cooperated with one or more of the coupling elements. Further, each of the weight-bearing platform, the one or more restricting elements, the one or more elevating elements, the one or more motors, the one or more sensors, and the one or more control circuits can each include the structural and functional characteristics discussed above relative to the shopping cart apparatus.

In some embodiments, methods are provided for enabling consumers to reach commercial products positioned above the consumer. Some of these methods include ascertaining when a threshold amount of pressure is applied upon one or more sensors. The one or more sensors can be secured proximate to at least one of a cart frame and a weight-bearing platform. The cart frame typically has a plurality of cart wheels coupled thereto. The weight-bearing platform can be configured to be mechanically coupled to a rear portion of the cart frame via a slide mechanism comprising one or more elongated slide members and one or more guide members. By one approach, the methods may include activating one or more first motors configured to be mechanically coupled to one or more restricting elements when the threshold amount of pressure is applied and thereby cause the one or more restricting elements to restrict rotational movement of one or more front cart wheels of the plurality of cart wheels.

The one or more restricting element can be configured to be positioned proximate to the one or more front cart wheels. In some embodiments, the methods may include activating one or more second motors configured to be mechanically coupled to the slide mechanism to deploy the weight-bearing platform distal to the cart frame when the threshold amount of pressure is applied upon the one or more sensors and thereby cause an elevating element coupled to the elongated slide member to engage the one or more guide members and utilize a support element coupled to the slide mechanism as a fulcrum point about which to elevate the rear portion of the cart frame.

As used herein, "retail facility" will be understood to refer to a facility that comprises a retails sales facility or any other type of bricks-and-mortar (i.e., physical) facility in which products are physically displayed and offered for sale to customers who physically visit the facility. The retail facility may include one or more of sales floor areas, check out locations (i.e., point of sale (POS) locations), customer service areas other than checkout locations (e.g., service areas to handle returns), parking locations, entrance and exit areas, stock room areas, stock receiving areas, hallway areas, common areas shared by merchants, and so on. The facility may be any size or format of facility, and may include products from one or more merchants. For example, a facility may be single store operated by one merchant or may be a collection of stores covering multiple merchants, such as a mall.

At such facilities, shelves, racks, bins, modulars, etc. of products may be arranged in one or more aisles, passageways, corridors, openings, walkways, egresses, ingresses, openings, similar passages, or a combination of two or more thereof. In some embodiments, the products may be arranged on the shelves, racks, bins, modulars, etc. and/or about the facility in a manner that can maximize the number of selling opportunities (i.e., purchase opportunities) for the business(es). The overall design of retail facilities may induce or encourage customers to enter the facility and explore the physical environment while engaging in a variety of retail experiences (e.g., browsing, sampling, purchasing, and/or similar retail experiences). At retail facilities, customers are often provided with shopping carts to store products while the customer traverses the retail facility (e.g., such containers may include shopping carts, shopping baskets, shopping buggies, shopping carriages, similar containers, or a combination of two or more thereof).

Figure 2:
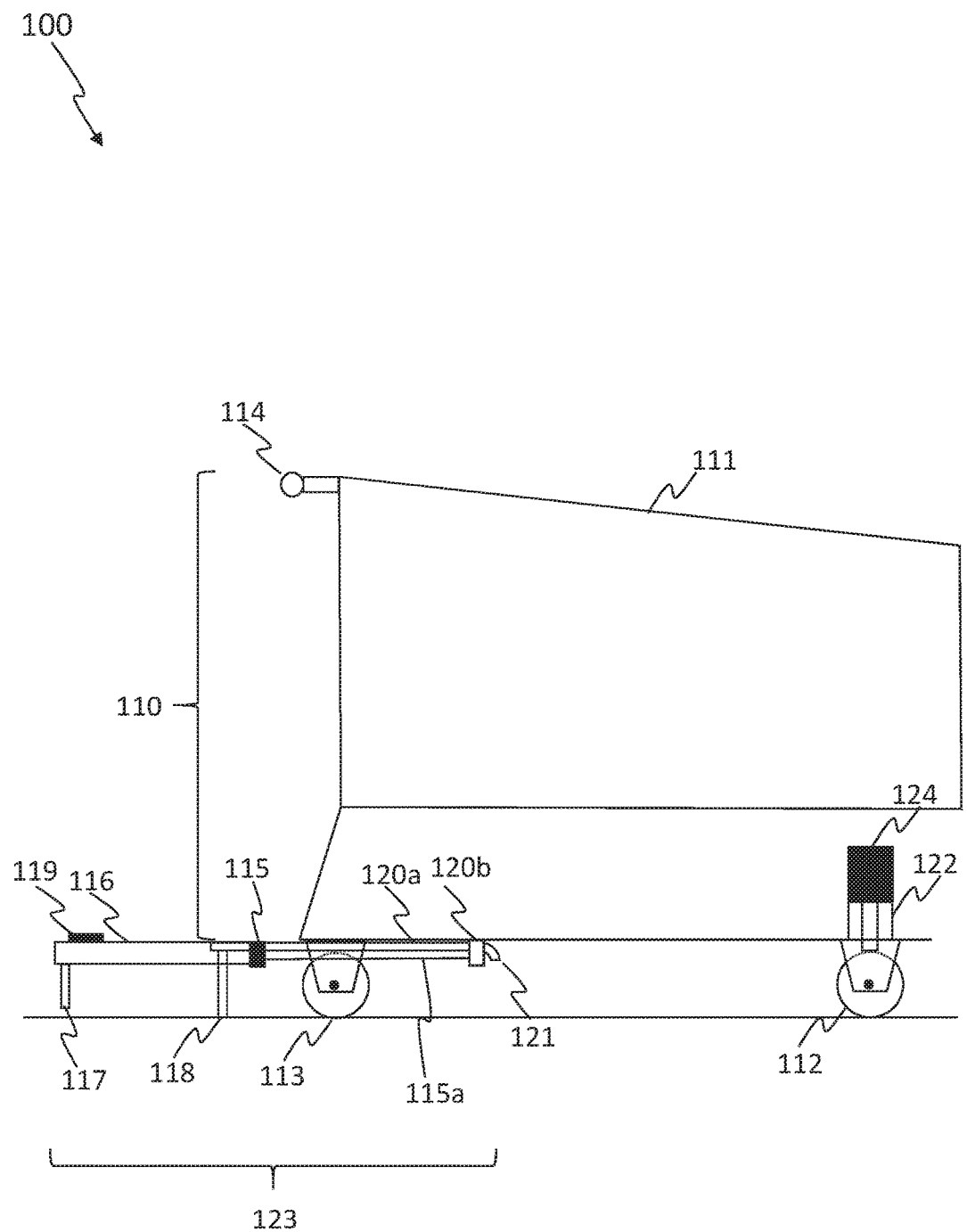
FIG. 2 is an illustration of a cart stool in accordance with some embodiments.
Figure 3:
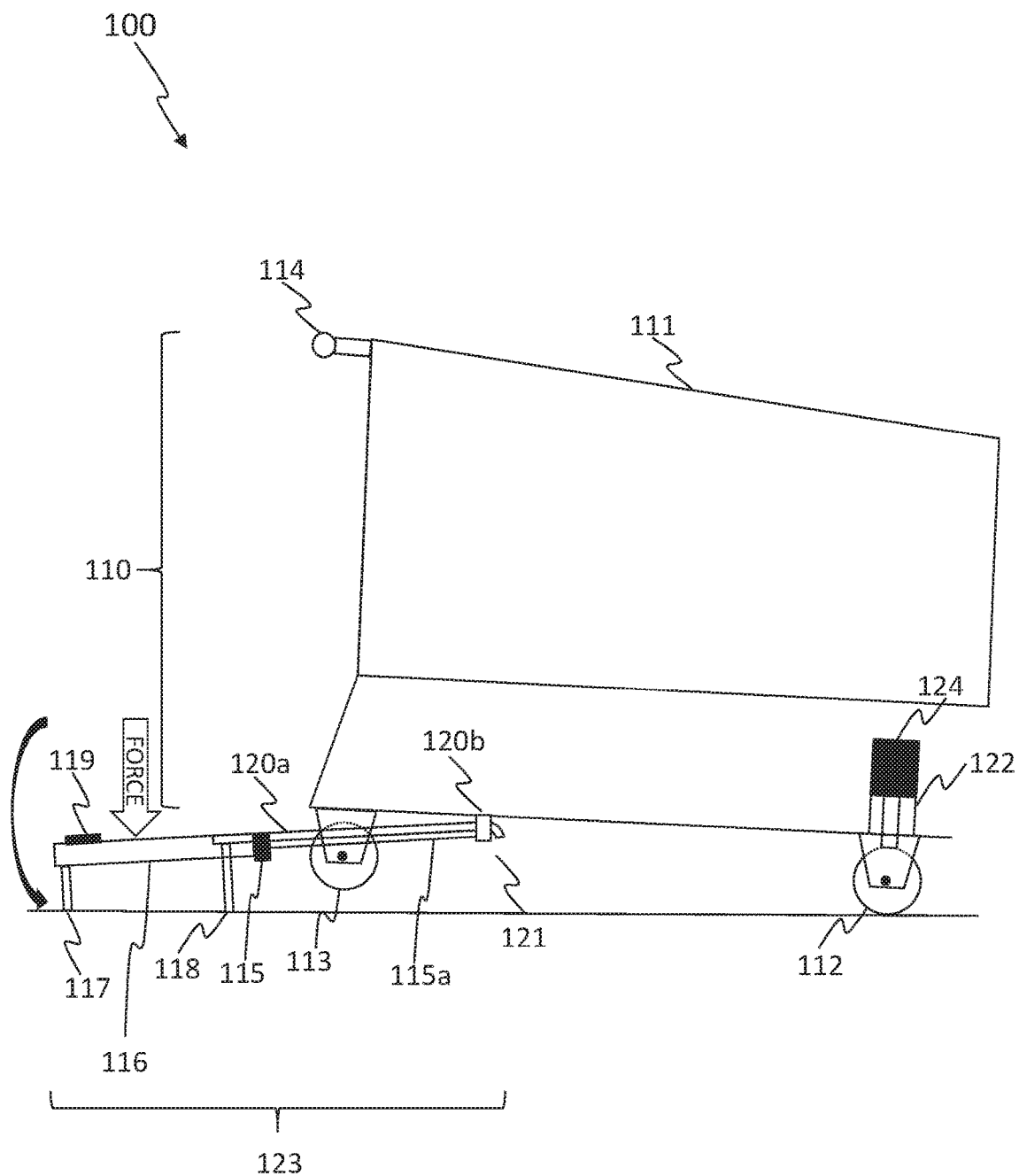
FIG. 3 is an illustration of a cart stool in accordance with some embodiments.

By one approach, the various embodiments disclosed herein may be implemented at a retail facility environment. Referring now to the drawings, and in particular to FIGS. 1-3 illustrating an exemplary shopping cart 100, in accordance with some embodiments. The shopping cart 100 can have a cart frame 110 that may include one or more basket portions 111 and/or a handle 114 affixed thereto such that the shopping cart 100 can easily be moved around a retail facility as the customer fills the one or more basket portions 111 with various products they intend to purchase. In some embodiments, the cart frame 110, the handle 114, the one or more basket portions 111, or a combination of two or more thereof may be made of metal, plastic, glass, wood, or a combination of two or more thereof. The shopping cart 100 can include a plurality of wheels (e.g., one or more front wheels 112 and/or one or more rear wheels 113) affixed to a bottom surface of the cart frame 110 to facilitate movement thereof. A simple example of the shopping cart 100 would be a shopping cart as one typically finds at many retail facilities, or a rocket cart, a flatbed cart or any other mobile basket or platform that may be used to gather items for potential purchase.

In some embodiments, the shopping cart 100 can include a moveable cart stool 123 configured to be stepped on by the customer to reach items that are located at an elevated position relative to the customer. In some embodiments, the moveable cart stool 123 can be configured to be permanently or selectively affixed or secured to a rear region of the cart frame 110. For example, the moveable cart stool 123 can include a slide mechanism 120 that can be permanently or selectively affixed to a bottom-rear region of the cart frame 110 via one or more fasteners and/or one or more coupling elements (e.g., via weldings, screws, bolts, nuts, buckles, clamps, clasps, closures, latches, pins, rivets, similar fasteners, similar coupling elements, or a combination of two or more thereof) such that the slide mechanism is positioned proximate to the surface upon which the shopping cart 100 rests upon ("resting surface"). For example, the slide mechanism 120 can be affixed to a lower region of the cart frame 110 below the one or more basket portions 111 and proximate to the rear wheel 113. By one approach, each longitudinal side can include a copy of the slide mechanism 120 and associated components thereof. In some embodiments, the slide mechanism 120 can be positioned along a centerline of the bottom-rear portion of the cart frame 110

In some embodiments, the slide mechanism 120 can include a guide member 120b and an elongated slide member 120a that at least partially rests in the guide member 120b such that the guide member 120b guides the movement of an elongated slide member 120a and an elevating element 121, which is secured to the distal end of the elongated slide member 120a, via a guide conduit that can be positioned on one or more inner surfaces of the guide member 120b such that the elongated slide member 120a can reciprocate horizontally relative to the guide member 120b. In some embodiments, a plurality of rollers, bearings, wheels, or similar elements configured to reduce friction between the guide member 120b and the elongated slide member 120a, or a combination of two or more thereof may be affixed to one or more outer horizontal surfaces of the elongated slide member 120a or an interior of the guide member 120b such that the plurality of friction reducing elements can rest in the guide conduit of the guide member 120b and thereby facilitate the reciprocating motion of the elongated slide member 120a.

In some embodiments, the reciprocating motion of the elongated slide member 120a is configured to permit the slide mechanism 120 to slide between a stowed position (e.g., as depicted in FIG. 1) and a deployed position (e.g., as depicted in FIGS. 2 and 3). In some embodiments, the weight-bearing platform 116 can be physically secured to the elongated slide member 120a (e.g., via weldings, bonds, fasteners, couplers, or a combination of two or more thereof) such that the weight-bearing platform 116 is positioned distal to the rear portion of the shopping cart 100 when the slide mechanism 120 is in the deployed position, and in some embodiments is at least partially stowed under the rear region of the one or more basket portions 111 when the slide mechanism 120 is in the stowed position. In some embodiments, the weight-bearing platform 116 can be configured to include one or more support elements 118 secured proximate to (or protrude from) the distal region of the weight-bearing platform 116 (e.g., one or more lateral surfaces, an under surface, or a combination of two or more thereof) and configured to extend toward the resting surface.

In some embodiments, the support element 118 can be configured to have a deployed position and a stowed position when the slide mechanism 120 is in the deployed position and stowed position, respectively. For example, the support element 118 can be configured to be hinge-secured at one end (e.g., the top end/portion) to the distal portion of the weight-bearing platform 116 and have one or more lateral surfaces secured (e.g., rotationally secured, physically secured, or similar coupling solutions) to a spring-loaded appendage (e.g., secured to a lateral surface or the under surface of the weight-bearing platform 116) such that the support element 118 can rotate toward the resting surface under the assistance of the spring loaded appendage when the slide mechanism is in the deployed state. The support element 118 can rotate up towards the weight-bearing platform 116 by engaging an assist element secured to one or more lateral surfaces of the guide member 120b and having an indentation such that the support element 118 can traverse up the indentation and thereby be guided in to the stowed position.

By one approach, the weight-bearing platform 116 may further be configured to include one or more support elements 117 secured to the proximate region of the weight-bearing platform 116 (e.g., one or more lateral surfaces or a region of the under surface of the weight-bearing platform 116) and configured to project towards the resting surface. By one approach, the vertical length of the support element 118 can be configured to be greater than the vertical length of the support element 117, which thereby allows the weight-bearing platform 116 to partially move or partially rotate towards the resting surface as a threshold amount of pressure is applied to the top surface of the weight-bearing platform 116, as depicted in FIG. 3.

Falls from elevated platforms, such as weight-bearing platform 116, can result in injury even when the elevated platform is positioned at a level that is several inches above the resting surface. Falls from elevated platforms can increase when such apparatuses fail provide a rigid, stable, and level support for users. In some embodiments, shopping cart 100 can be configured to include one or more restricting elements 122 secured to the cart frame 110 and positioned proximate to one or more front wheels 112. For example, the restricting elements 122 can each include one or more mechanical assemblies configured to include an actuating mechanism for setting and releasing a wheel restricting element such that the actuating mechanism operates in a first mode (e.g., deployed position) to apply the wheel restricting element to the one or more front wheels 112 thereby restricting the rotational movement thereof and in a second mode (e.g., stowed position) to remove the wheel restricting element from the one or more front wheels 112. By one approach, the slide mechanism 120 can be mechanically coupled to the one or more mechanical assemblies such that transition of the slide mechanism 120 to the deployed position causes the one or more mechanical assemblies to transition to the first mode and apply the wheel restricting element to the one or more front wheels 112 to restrict the rotational movement thereof.

As depicted in FIG. 2, the deployed state of slide mechanism 120 can horizontally position the weight-bearing platform 116 distal to the rear portion of the cart frame 110 such that the support element 118 contacts the resting surface, the one or more restricting elements 122 restricts the rotational movement of the one or more front wheels 112, and the elevating element 121 contacts a portion of the inner surface of the guide member 120b, as depicted in FIG. 2. By one approach, the bottom surface of the support element 118 and/or support element 117 can have applied thereto a restricting component (e.g., a polymeric covering or similar component) configured to reduce or restrict the horizontal movement of the weight-bearing platform 116 when the support element 118 and/or support element 117 contact the resting surface. As depicted in FIG. 3, the proximal end of the weight-bearing platform is configured to rotate the resting surface such that the elevating element 121, utilizing the support element 118 as a fulcrum point (a contact point), lifts the rear portion of the cart frame 110 and thereby elevates the rear wheels 113 off of the resting surface when the threshold amount of pressure is applied upon the top surface of the distally positioned weight-bearing platform 116. For example, the threshold amount of pressure can be set by the consumer, retailer, and/or the shopping cart manufacturer. The threshold amount of pressure can be configured to correspond to 3 psi or more.

By one approach, one or more of the functions of the slide mechanism 120 and/or the restricting element 122 can be assisted by one or more electronic motors, which may increase or enhance the customer service provided by the moveable cart stool 123. Convenience can be a critical factor in determining how customers make decisions about what to purchase, where to go, and with whom to engage. Convenience can reflect the amount of time and effort a customer needs to complete a particular task. By one approach, one or more devices 119 can be secured to one or more surfaces (e.g., the top surface, one or more lateral surfaces, or a combination of two or more thereof) of the weight-bearing platform 116 such that pressure applied to the surfaces of the weight-bearing platform 116 is detected/received by the devices 119. In some embodiments, one or more devices 119 can be secured to one or more surfaces of the cart frame 110 (e.g., the one or more basket portions 111, the handle 114, or a combination of the two).

Figure 1B:
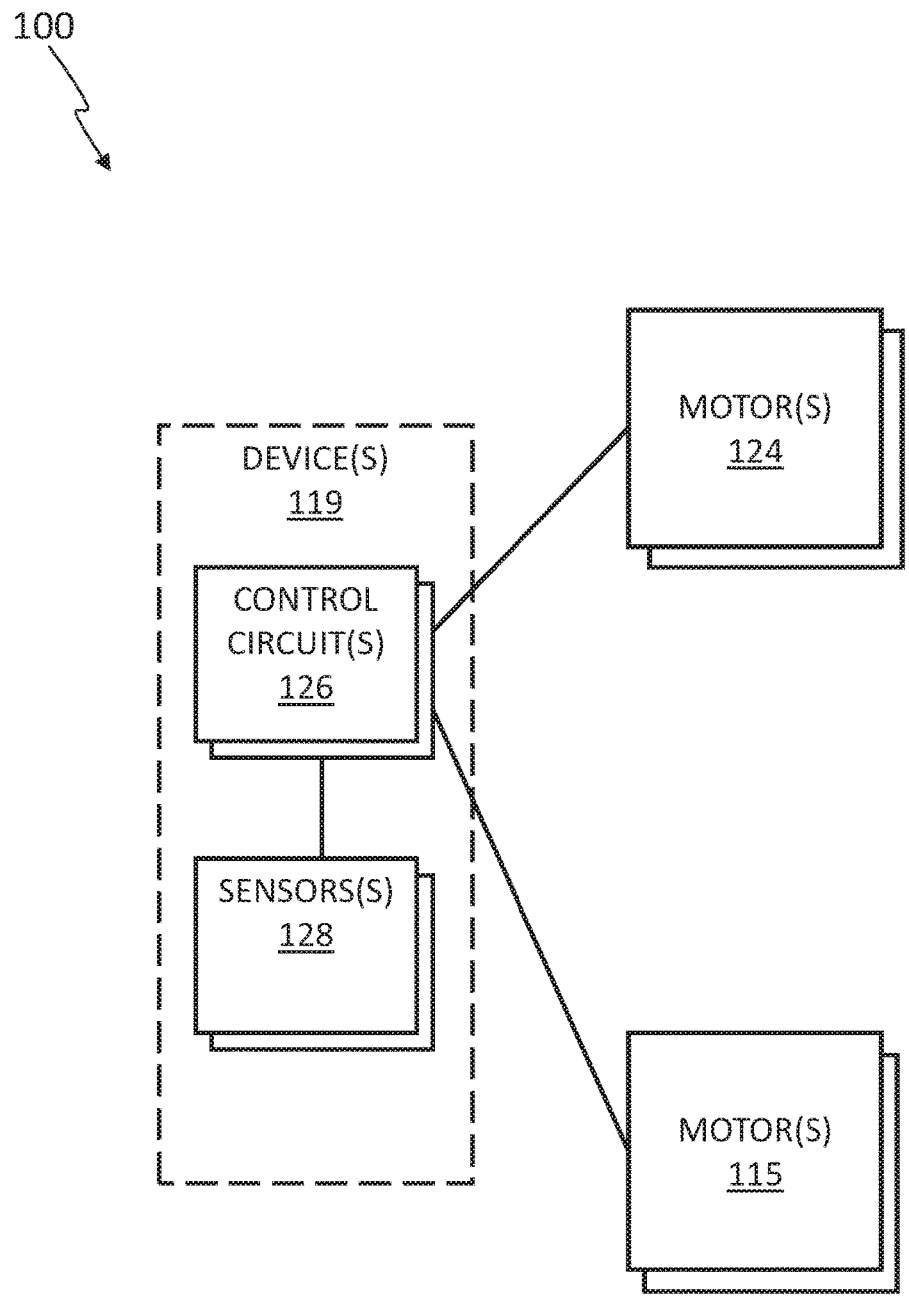
FIG. 1b comprises a block diagram as configured in accordance with some embodiments.

As depicted in FIG. 1b, in some embodiments, the devices 119 can each include one or more control circuits 126 conductively coupled to one or more sensors 128 that may each be configured to detect or monitor the motion of and/or pressure applied to the one or more surfaces of the weight-bearing platform 116. Being a "circuit", the control circuit 126 therefore comprises structure that includes at least one (and typically many) electrically-conductive paths (such paths comprised of a conductive metal such as copper or silver) that convey electricity in an ordered manner, which path(s) will also typically include corresponding electrical component (both passive (such as resistors and capacitors) and active (such as any of a variety of semiconductors-based devices) as appropriate) to permit the circuit to effect the control aspect of these teachings.

Such a control circuit 126 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structured are well known an understood in the art and require no further description here. This control circuit 126 is configured (for example, by using corresponding programming as will be well understood by those skilled in the art) to carry out one or more of the steps, actions, and/or functions described herein.

By one optional approach the control circuit 126 operably couples to a memory (not shown). This memory may be integral to the control circuit 126 or can be physically discrete (in whole or in part) from the control circuit 126 as desired. This memory can also be local with respect to the control circuit 126 (where, for example, both share a common circuit board, chassis, power supply, and/or housing) or can be partially or wholly remote with respect to the control circuit 126 (where, for example, the memory is physically located in another area of the shopping cart 100 as compared to the control circuit 126).

This memory can serve, for example, to non-transitorily store computer instructions that, when executed by the control circuit 126, cause the control circuit 401 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Data generated by the one or more sensors 128 may be communicated to the one or more control circuits to determine when use of the moveable cart stool 123 is desired. The one or more control circuits can also be conductively coupled to one or more motors 115 and/or one or more motors 124. In some embodiments, the devices 119 can be configured to activate the motors 115, the motors 124, or a combination of the two when a threshold amount of pressure is detected by the one or more sensors 128. Similarly, the devices 119 can be configured to cause the motors 115 and/or the motors 124 to resume their pre-activated state when the threshold amount of pressure is no longer detected by the one or more sensors 128 or when an additional threshold amount of pressure is detected by the one or more sensors 128. For example, one or more triggering events may be generated when the threshold amount of pressure is detected by the one or more sensors 128 such that the motors 115 and/or the motors 124 are activated when the one or more triggering events are generated. In some embodiments, each of the one or more motors 124 may be mechanically coupled to the actuating mechanism of the restricting element 122 and configured to move the actuating mechanism between the first mode and the second mode (discussed above).

By one approach, one or more motor 115 can be affixed to one or more surfaces of the proximal end of the elongated slide member 120a or the distal end of the weight-bearing platform 116 and configured to move the slide mechanism 120 between the stowed position (depicted in FIG. 1) and the deployed position (depicted in FIGS. 2 and 3). In some embodiments, the motors 115 can each be configured to transfer rotational mechanical torque to elongated screw 115a that is threaded through a nut assembly secured to the an outer surface of the guide member 120b. The elongated screw 115a and the nut each having matching helical grooves. The motors 115 and/or motors 124 can each be conductively coupled to a power source such that when a threshold amount of pressure is detected by the devices 119 the motors 115 are activated by the devices 119 to rotate in a first direction (e.g., clockwise) such that the elongated screw 115a rotates in a particular direction and thereby causes the distance between the motors 115 and the guide member 120b to increase thereby moving the weight-bearing platform in the deployed position. As the motors 115 cause the slide mechanism 120 to transfer to the deployed position, said increased distance causes the elevating element 121 to engage the guide member 120b and thereby elevate the rear portion of the cart frame 110.

Similarly, when the threshold amount of pressure is no longer detected by the devices 119, the devices 119 can be configured to cause the motors 115 to return to their pre-activated state such that the motors 115 rotate in a second direction (e.g., counter clockwise) and cause the elongated screw 115a to rotate in the same direction and thereby reduce the distance between the motors 115 and the guide 120b, which transfers the slide mechanism 120 from the deployed position to the stowed position and also decreases the elevation of the rear portion of the cart frame 110.

Figure 4:
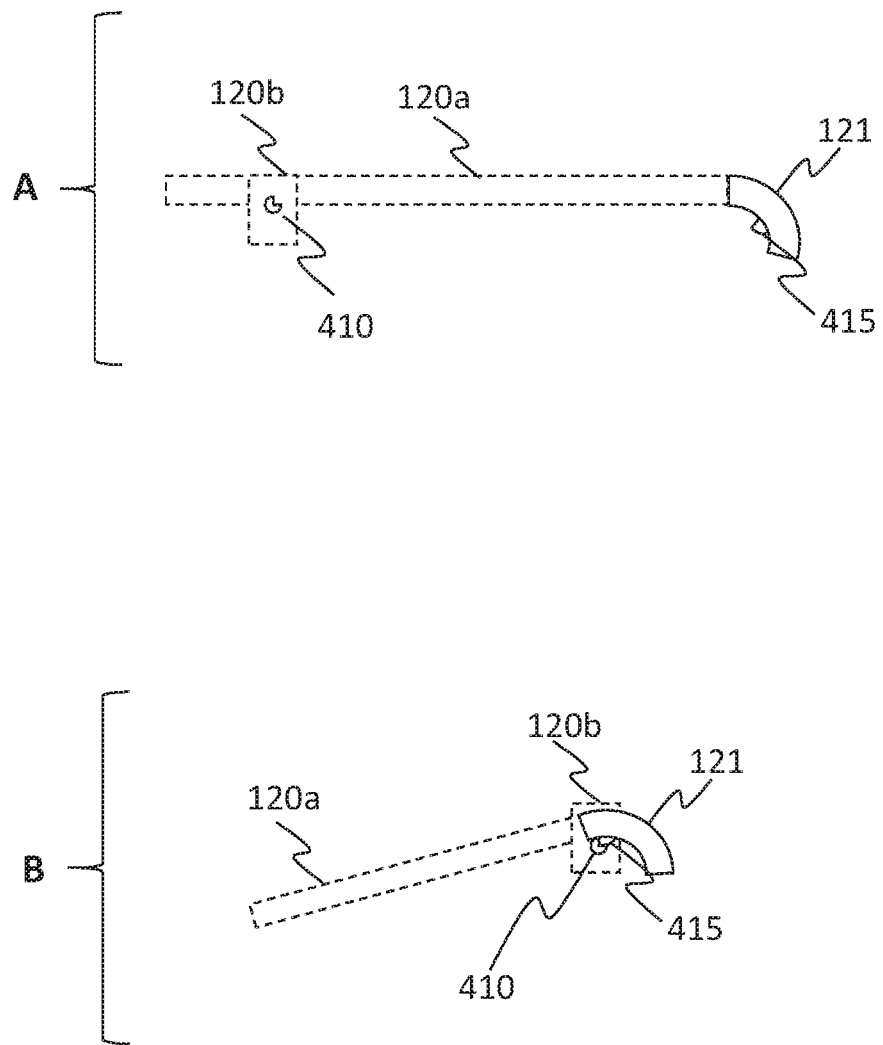
FIG. 4 is an illustration of a slide mechanism in accordance with some embodiments.

Referring now to FIG. 4. Views A and B of FIG. 4 depict an exemplary of the stowed state and the deployed state (e.g., subsequent to the application of the threshold amount of pressure upon the weight-bearing platform 116 or the devices 119), respectively, of the slide mechanism 120. In some embodiments, the elevating element 121 can include one or more mechanical arrangements that that are configured to facilitate the decrease of the height a portion of the weight-bearing platform 116 (e.g., the rear portion) to a first height and elevates the rear portion of the cart frame to a second height when the threshold amount of pressure is applied upon the weight-bearing platform 116 or the devices 119. For example, the guide member 120b can be configured to have a cam slot 410 secured to a vertical inner surface thereof and configured to receive one or more cammed portions 415 extending from a bottom surface of the elevating element 121. In some embodiments, the cammed portion 415 can be configured to contact the cam slot 410 when the slide mechanism 120 is in the deployed state (e.g., to restrict further rotational movement of the elevating element 121 beyond the cam slot 410) such that the cammed portion 415 engages the cam slot 410 when the elevating element 121 lifts the rear portion of the cart frame 110 to a predetermined height (e.g., to restrict additional axial rotation of the elevating element 121 beyond the cam slot 410).

Figure 5:
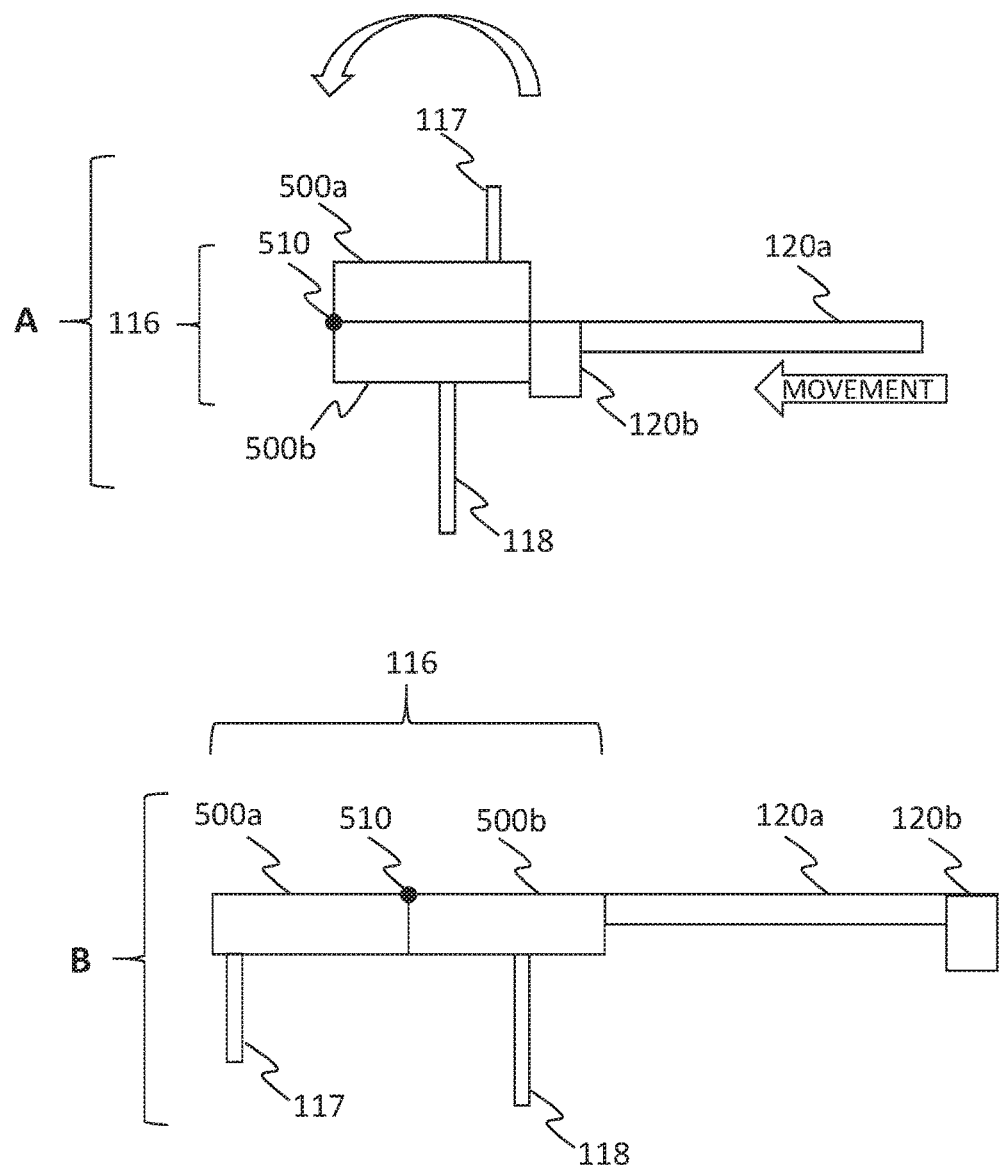
FIG. 5 is an illustration of a weight-bearing platform in accordance with some embodiments.

Referring now to FIG. 5. In some embodiments, the weight-bearing platform 116 can be configured to include a plurality of hinge secured platform segments 500. For example, the platform segments 500a and 500b can be configured to be hinge secured together via a hinge assembly 510 such that the weight-bearing platform 116 can transition between a collapsed position (i.e., a folded position) when the slide mechanism 120 is in the stowed position (view A of FIG. 5) and an extended position (i.e., an unfolded position) where the weight-bearing platform 116 can expand away from the rear portion of the cart frame 110 when the slide mechanism 120 is in the deployed position (view B of FIG. 5). For example, the hinge assembly 510 can be configured to have a plurality of hinge plates rotationally secured together via one or more pins where platform segments 500a and 500b each have one or more hinge plates secured to an external surface thereof such that the top surface of the platform segment 500a can rest upon the top surface of the platform segment 500b when the slide mechanism 120 is in the stowed position. When use of the weight-bearing platform 116 is desired, the slide mechanism 120 can be moved to the deployed position and the platform segment 500a can rotate down relative to the platform segment 500b and away from the cart frame 110 such that the distal lateral surface of the platform segment 500a is moved adjacent to the proximal lateral surface of the platform segment 500b, as depicted in view B of FIG. 5.

Figure 6:
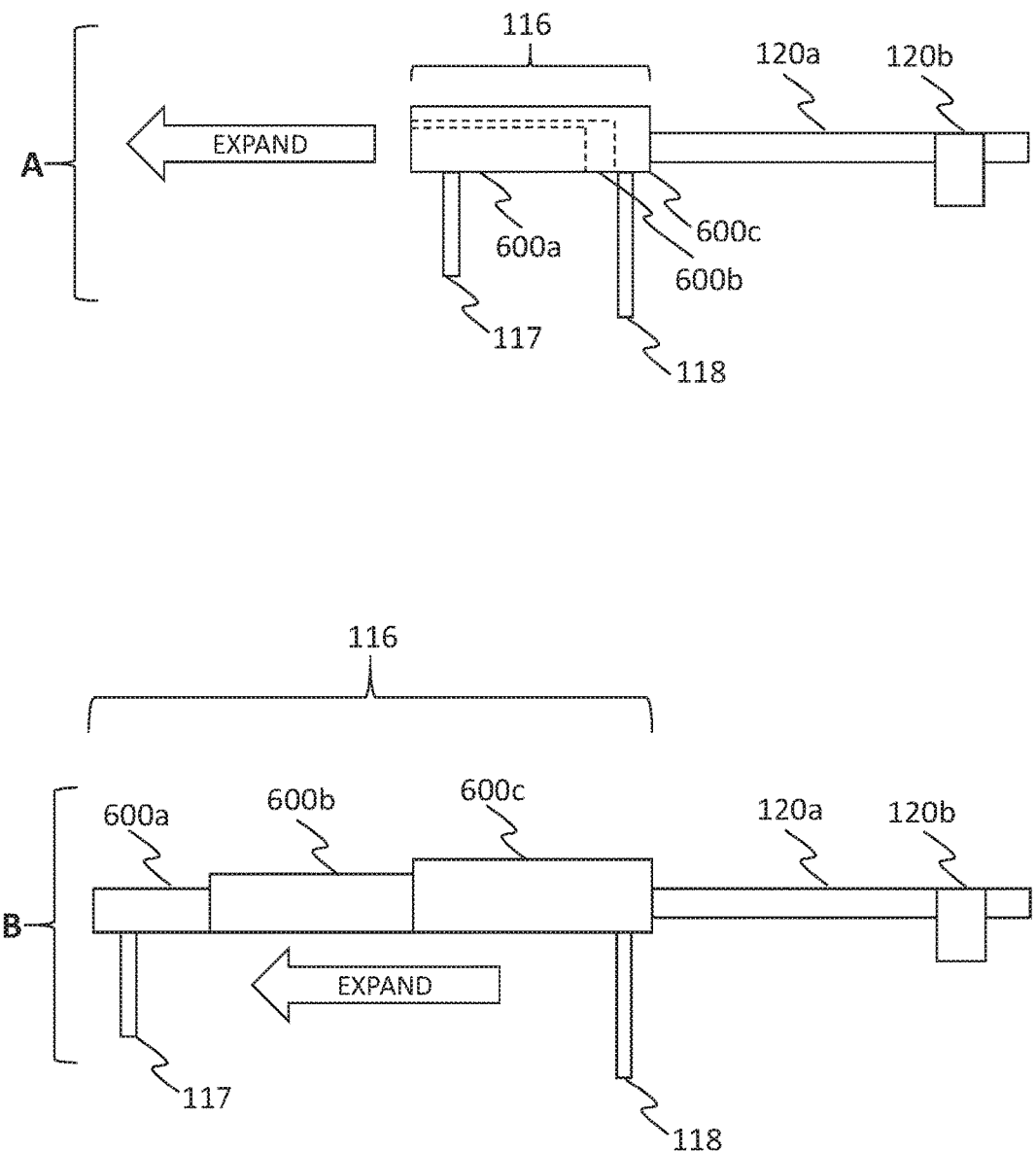
FIG. 6 is an illustration of a weight-bearing platform in accordance with some embodiments.

Referring now to FIG. 6. In some embodiments, the weight-bearing platform 116 can be configured to transition between a collapsed position (view A) and an extended position (view B) such that the weight-bearing platform 116 can expand away from the rear portion of the cart frame 110 when the slide mechanism is in the deployed position. For example, the weight-bearing platform 116 can include a plurality of sequentially nested platform segments 600 that are configured to horizontally expand such that the weight-bearing platform 116 can expand away from the rear portion of the cart frame 110 or collapse towards the rear section of the weight-bearing platform 116. In some embodiments, platform segments 600 can be configured to have a horizontal guide slot and/or complementary horizontal guide rails. For example, each platform segment 600 can be configured to have a horizontal guide slot positioned in the inner surface of one or more side lateral walls and configured to accept a complementary horizontal guide rail projecting from the adjacent outer surface of the side lateral wall of the platform segment nested therein. In some embodiments, the platform segment 600a can be configured to nest at least partially within platform segment 600b, which can be configured to nest at least partially within platform segment 600c.

Figure 7:
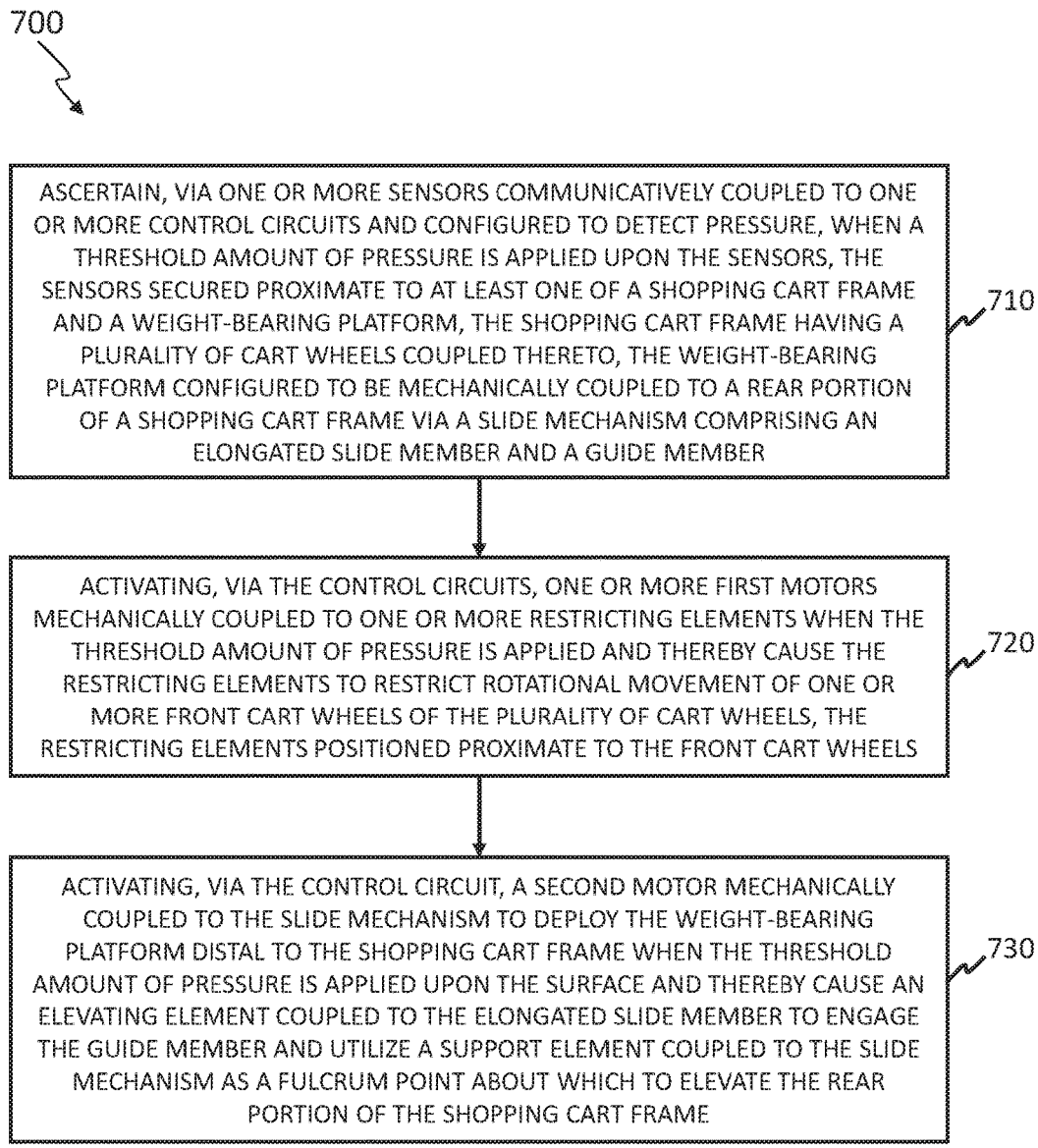
FIG. 7 is a flow diagram as configured in accordance with some embodiments.

In particular, FIG. 7 illustrates the operational steps of illustrative process 700 for enabling a consumer to reach commercial products positioned above the consumer. In this description, it will be presumed that the one or more control circuits 126 carries out one, some, or all of the of the described activities that comprise this process 700. When a threshold amount of pressure is applied upon one or more sensors 128 secured proximate to at least one or a cart frame 110 and a weight-bearing platform 116 can be assessed at block 710 by one or more control circuits 126. For example, the cart frame 110 can be configured to have a plurality of cart wheels coupled thereto. The weight-bearing platform 116 can be configured to be mechanically coupled to a rear portion of the cart frame 110 via a slide mechanism 120 that can comprise one or more elongated slide members 120a and one or more guide members 120b.

One or more motors 124 can be configured to be mechanically coupled to one or more restricting elements 122 and activated when the threshold amount of pressure is applied at block 720 by the one or more control circuits 126. For example, activation of the one or more motors 124 can cause the one or more restricting elements 122 to restrict rotational movement of one or more front cart wheels 112 of the plurality of cart wheels. By one approach, the one or more restricting elements 122 can be positioned proximate to the one or more front cart wheels 112. One or more motors 115 can be configured to be mechanically coupled to the slide mechanism 120 and deploy the weight-bearing platform 116 distal to the cart frame 110 when the threshold amount of pressure is applied at block 730 by the one or more control circuits 126. For example, activation of the one or more motors 115 can cause one or more elevating elements 121 coupled to the elongated slide member 120 to engage the one or more guide members 120b and utilize one or more support elements 118 coupled to the slide mechanism 120 as a fulcrum point about which to elevate the rear portion of the cart frame 110.

In some embodiments, a shopping cart apparatus is provided to enable a consumer to reach commercial products positioned above the consumer. The shopping cart apparatus may include a cart frame having a plurality of cart wheels coupled to the cart frame. A slide mechanism may be slidably cooperated with the cart frame. A weight-bearing platform can be secured with the slide mechanism proximate a first end of the slide mechanism, wherein the slide mechanism can slide between a stowed position and a deployed position such that the weight-bearing platform can be moved away from a rear portion of the cart frame when the slide mechanism is in the deployed position. One or more restricting elements can each be positioned proximate to one or more front cart wheels included in the plurality of cart wheels and can restrict the rotational movement of the front cart wheel when the slide mechanism is in the deployed position.

One or more support elements can be affixed to the weight-bearing platform. One or more elevating elements can be secured to a second end of the slide mechanism and may be configured to rotably engage a connecting member of the slide mechanism when the slide mechanism is in the deployed position. When the slide mechanism is in the deployed position the support element can be configured to be positioned proximate to the rear-portion of the cart frame in contact with a surface upon which the cart is supported such that the one or more elevating elements can utilize the one or more support elements as contact points with which to lift the rear portion of the cart frame such that the back wheels of the plurality of cart wheels can be lifted off the surface when a threshold amount of pressure is applied upon the weight-bearing platform.

In some embodiments, one or more motors can be mechanically coupled to the slide mechanism. One or more sensors can be configured to monitor pressure that is applied upon the weight-bearing platform. One or more control circuits can be communicatively coupled to the one or more sensors and may be configured to utilize sensor data to ascertain when the threshold amount of pressure is applied upon the weight-bearing platform. The one or more control circuits may also be configured to activate the one or more motors and thereby cause the one or more elevating elements to lift the rear portion of the cart frame such that the back wheels thereof are lifted off the surface when the threshold amount of pressure is applied upon the weight-bearing platform. In some embodiments, the one or more elevating elements may further comprises one or more mechanical arrangements that can decreases the height of the weight-bearing platform to a first height and elevate the rear portion of the cart frame to a second height when the threshold amount of pressure is applied upon the weight-bearing platform.

In some embodiments, the one or more elevating elements can each comprise one or more cammed portions each configured to engage a cam slot of the slide mechanism when the rear portion of the cart frame is lifted such that when the cammed portion engages the cam slot motion of the one or more elevating elements is restricted. In some embodiments, the weight-bearing platform may further comprise two or more segments each hinge secured to one or more other segments via a hinge. For example, the weight-bearing platform may be configured to unfold about each hinge distal to the cart frame when the slide mechanism is in the deployed position. In some embodiments, one or more sensors can be secured to the weight-bearing platform and configured to monitor pressure applied upon the weight-bearing platform, one or more motors can be mechanically coupled to the slide mechanism, and one or more control circuits can be secured to the weight-bearing platform and communicatively coupled to the one or more motors and the one or more sensors.

For example, the one or more control circuits can be configured to use sensor data from the one or more sensors to ascertain when a second threshold amount of pressure is applied upon the weight-bearing platform, and activate the one or more motors to cause the slide mechanism to slide from the stowed position to the deployed position when the second threshold amount of pressure is applied upon the weight-bearing platform. In some embodiments, the weight-bearing platform can be configured to include a nestably stackable assembly that includes a plurality of sequentially nested platform segments and be configured to transition between a collapsed position and an extended position such that the plurality of sequentially nested platform segments expand away from the rear portion of the cart frame when the slide mechanism is in the deployed position.

In some embodiments, one or more sensors can be secured to the weight-bearing platform and configured to monitor pressure applied upon the weight-bearing platform, one or more motors can be mechanically coupled to the one or more restricting elements, and one or more control circuits can be secured to the weight-bearing platform and communicatively coupled to the one or more motors and the one or more sensors. For example, the one or more control circuits can be configured to utilize data from the one or more sensors to ascertain when the threshold amount of pressure is applied upon the weight-bearing platform and activate the one or more motors to cause the one or more restricting elements to restrict rotational movement of at least one or the front cart wheel when the threshold amount of pressure is applied upon the weight-bearing platform.

In some embodiments, a shopping cart extension apparatus can be configured to selectively affixed to the rear portion of the cart frame via one or more coupling elements to enable consumers to reach commercial products positioned above the consumer. By one approach, the slide mechanism can be slidably cooperated with the one or more coupling elements. In some embodiments, each of the weight-bearing platform, the one or more restricting elements, the one or more elevating elements, the one or more motors, the one or more sensors, and the one or more control circuits can each include the structural and functional characteristics discussed above relative to the shopping cart apparatus.

In some embodiments, methods are provided for enabling consumers to reach commercial products positioned above the consumer. Some of these methods include ascertaining when a threshold amount of pressure is applied upon one or more sensors. The one or more sensors can be secured proximate to at least one of a cart frame and a weight-bearing platform. The cart frame typically has a plurality of cart wheels coupled thereto. The weight-bearing platform can be configured to be mechanically coupled to a rear portion of the cart frame via a slide mechanism comprising one or more elongated slide members and one or more guide members. By one approach, the methods may include activating one or more first motors configured to be mechanically coupled to one or more restricting elements when the threshold amount of pressure is applied and thereby cause the one or more restricting elements to restrict rotational movement of one or more front cart wheels of the plurality of cart wheels.

The one or more restricting element can be configured to be positioned proximate to the one or more front cart wheels. In some embodiments, the methods may include activating one or more second motors configured to be mechanically coupled to the slide mechanism to deploy the weight-bearing platform distal to the cart frame when the threshold amount of pressure is applied upon the one or more sensors and thereby cause an elevating element coupled to the elongated slide member to engage the one or more guide members and utilize a support element coupled to the slide mechanism as a fulcrum point about which to elevate the rear portion of the cart frame.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A shopping cart apparatus to enable a consumer to reach commercial products positioned above the consumer, the shopping cart apparatus comprising:
   a cart frame having a plurality of cart wheels coupled to the cart frame;
   a slide mechanism slidably cooperated with the cart frame;
   a weight-bearing platform secured with the slide mechanism proximate a first end of the slide mechanism, wherein the slide mechanism slides between a stowed position and a deployed position such that a weight-bearing platform is moved away from a rear portion of the cart frame when the slide mechanism is in the deployed position;
a restricting element positioned proximate to a front cart wheel included in the plurality of cart wheels and restricting a rotational movement of the front cart wheel when the slide mechanism is in the deployed position;
a support element affixed to the weight-bearing platform; and
an elevating element secured to a second end of the slide mechanism and configured to rotably engage a connecting member of the slide mechanism when the slide mechanism is in the deployed position such that when the slide mechanism is in the deployed position the support element is configured to be positioned proximate to the rear-portion of the cart frame in contact with a surface upon which the cart frame is supported such that elevating element utilizes the support element as a contact point with which to lift the rear portion of the cart frame such that a rear wheel of the plurality of cart wheels are lifted off the surface when a threshold amount of pressure is applied upon the weight-bearing platform.

2. The shopping cart apparatus of claim 1, further comprising:
a motor mechanically coupled to the slide mechanism;
a sensor configured to monitor pressure applied upon the weight-bearing platform; and
a control circuit communicatively coupled to the sensor and configured to:
ascertain, using sensor data, when the threshold amount of pressure is applied upon the weight-bearing platform; and
activate the motor and thereby cause the elevating element to lift the rear portion of the cart frame such that the back wheels are lifted off the surface when the threshold amount of pressure is applied upon the weight-bearing platform.

3. The shopping cart apparatus of claim 1, wherein the elevating element further comprises a mechanical arrangement configured to facilitate a decrease of a height of a portion of the weight-bearing platform to a first height and elevates the rear portion of the cart frame to a second height when the threshold amount of pressure is applied upon the weight-bearing platform.

4. The shopping cart apparatus of claim 1, wherein the elevating element comprises a cammed portion configured to engage a cam slot of the slide mechanism when the rear portion of the cart frame is lifted such that when the cammed portion engages the cam slot a motion of the elevating element is restricted.

5. The shopping cart apparatus of claim 1, wherein the weight-bearing platform further comprises two or more segments each hinge secured to one or more other segments via a hinge, and the weight-bearing platform is configured to unfold about each hinge distal to the cart frame when the slide mechanism is in the deployed position.

6. The shopping cart apparatus of claim 1, further comprising
a sensor secured to the weight-bearing platform and configured to monitor pressure applied upon the weight-bearing platform;
a motor mechanically coupled to the slide mechanism; and a control circuit secured to the weight-bearing platform, communicatively coupled to the motor and the sensor, and configured to:
ascertain, via sensor data from the sensor, when a second threshold amount of pressure is applied upon the weight-bearing platform; and
activate the motor to cause the slide mechanism to slide from the stowed position to the deployed position when the second threshold amount of pressure is applied upon the weight-bearing platform.

7. The shopping cart apparatus of claim 1, wherein the weight-bearing platform comprises a plurality of sequentially nested platform segments and is configured to transition between a collapsed position and an extended position such that the plurality of sequentially nested platform segments expand away from the rear portion of the cart frame when the slide mechanism is in the deployed position.

8. The shopping cart apparatus of claim 1, further comprising:
a sensor secured to the weight-bearing platform and configured to monitor pressure applied upon the weight-bearing platform;
a motor mechanically coupled to the restricting element; and
a control circuit secured to the weight-bearing platform, communicatively coupled to the motor and the sensor, and configured to:
ascertain, via sensor data from the sensor, when the threshold amount of pressure is applied upon the weight-bearing platform; and
activate the motor to cause the restricting element to restrict a rotational movement of the front cart wheel when the threshold amount of pressure is applied upon the weight-bearing platform.

9. A shopping cart extension apparatus comprising:
a coupling element configured to selectively secured the shopping cart extension apparatus to a rear portion of a cart frame, the cart frame having a plurality of cart wheels coupled to the cart frame;
a slide mechanism slidably cooperated with the coupling element;
a weight-bearing platform secured with the slide mechanism proximate a first end of the slide mechanism, wherein the slide mechanism slides between a stowed position and a deployed position such that the weight-bearing platform is moved away from the rear portion of the cart frame when the slide mechanism is in the deployed position;
a restricting element positioned proximate to a front cart wheel included in the plurality of cart wheels and restricting a rotational movement of the front cart wheel when the slide mechanism is in the deployed position;
a support element affixed to the weight-bearing platform; and
an elevating element secured to a second end of the slide mechanism and configured to rotably engage a connecting member of the slide mechanism when the slide mechanism is in the deployed position such that when the slide mechanism is in the deployed position the support element is configured to be positioned proximate to the rear-portion of the cart frame in contact with a surface upon which the cart is supported such that the elevating element utilizes the support element as a contact point with which to lift the rear portion of the cart frame such that a rear wheel of the plurality of cart wheels are lifted off the surface when a threshold amount of pressure is applied upon the weight-bearing platform.

10. The shopping cart extension apparatus of claim 9, further comprising:
    a motor mechanically coupled to the elevating element;
    a sensor configured to monitor pressure applied upon the weight-bearing platform; and
    a control circuit communicatively coupled to the sensor and configured to:
      ascertain, using sensor data, when the threshold amount of pressure is applied upon the weight-bearing platform; and
      activate the motor and thereby cause the elevating element to lift the rear portion of the cart frame such that the back wheels are lifted off the surface when the threshold amount of pressure is applied upon the weight-bearing platform.

11. The shopping cart extension apparatus of claim 9, wherein the elevating element further comprises a mechanical arrangement configured to facilitate a decrease of a height of a portion of the weight-bearing platform to a first height and elevates the rear portion of the cart frame to a second height when the threshold amount of pressure is applied upon the weight-bearing platform.

12. The shopping cart extension apparatus of claim 9, wherein the elevating element comprises a cammed portion configured to engage a cam slot of the slide mechanism when the rear portion of the cart frame is lifted such that when the cammed portion engages the cam slot motion of the elevating element is restricted.

13. The shopping cart extension apparatus of claim 9, wherein the weight-bearing platform further comprises two or more segments each hinge secured to one or more other segments via a hinge, and the weight-bearing platform is configured to unfold about each hinge distal to the cart frame when the slide mechanism is in the deployed position.

14. The shopping cart extension apparatus of claim 9, further comprising
    a sensor secured to the weight-bearing platform and configured to monitor pressure applied to the weight-bearing platform;
    a motor mechanically coupled to the slide mechanism; and
    a control circuit secured to the cart frame, communicatively coupled to the motor and the sensor, and configured to:
      generate a triggering event when the threshold amount of pressure is applied to the weight-bearing platform; and
      activate the motor to cause the slide mechanism to slide from the stowed position to the deployed position when the triggering event is generated.

15. The shopping cart extension apparatus of claim 9, wherein the weight-bearing platform comprises a plurality of sequentially nested platform segments and is configured to transition between a collapsed position and an extended position such that the plurality of sequentially nested platform segments expand away from the rear portion of the cart frame when the slide mechanism is in the deployed position.

16. The shopping cart extension apparatus of claim 9, further comprising:
    a sensor secured to the weight-bearing platform and configured to detect pressure applied upon the weight-bearing platform;
    a motor mechanically coupled to the restricting element; and
    a control circuit secured to the weight-bearing platform, communicatively coupled to the motor and the sensor, and configured to:
      ascertain, via sensor data from the sensor, when the threshold amount of pressure is applied upon the weight-bearing platform; and
      activate the motor to cause the restricting element to restrict a rotational movement of the front cart wheel when the threshold amount of pressure is applied upon the weight-bearing platform.

\* \* \* \* \*